Dec. 30, 1952
H. H. SPENCER
2,624,036
CIRCUIT PROTECTION APPARATUS
Filed April 28, 1950
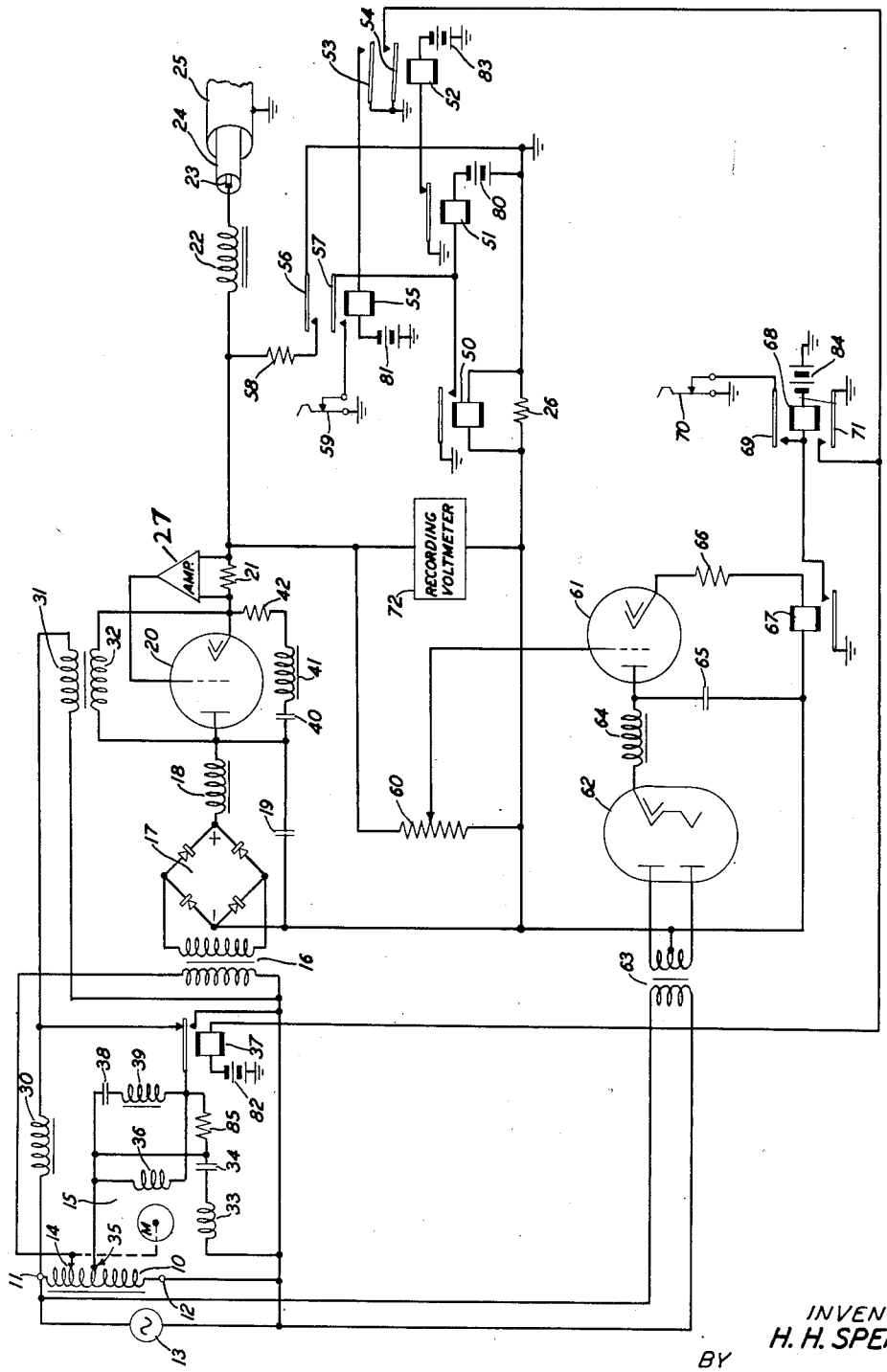
INVENTOR
H. H. SPENCER
BY
G. F. Heuerman
ATTORNEY Patented Dec. 30, 1952

2,624,036

UNITED STATES PATENT OFFICE 2,624,036

CIRCUIT PROTECTION APPARATUS

Harry H. Spencer, Springfield, N. J., assignor to Bell Telephone Laboratories, Incorporated, New York, N. Y., a corporation of New York Application April 28, 1950, Serial No. 158,880

10 Claims. (Cl. 321—19)

This invention relates to electric protective apparatus and more particularly to means for limiting to a safe amplitude the current transmitted over a cable conductor for energizing spaced repeaters which are provided in the cable signal transmission path.

An application of G. W. Meszaros, Serial No. 103,193, filed July 6, 1949, assigned to the assignee of the present application, now Patent No. 2,617,087, November 4, 1952, discloses apparatus for supplying substantially constant direct current to a load such as repeaters for amplifying signals transmitted over a submarine cable. The direct current is supplied from rectifiers through the space current paths of space current devices to the load, means being provided for controlling the resistance of the space current paths in response to load current changes for minimizing the changes of load current. Current is supplied to the rectifiers from an alternating-current source through a variable transformer the output voltage of which is automatically increased in response to a decrease of voltage drop across the space current paths in series with the load, and vice versa, thereby maintaining the voltage across the series space current devices within a normal operating range. A short circuit from anode to cathode of one of the space current devices in such an arrangement would result in increasing the alternating voltage supplied to the rectifiers and in increasing the direct current supplied to the cable to such an extent that the repeatered cable would be damaged.

The principal object of the present invention is to provide means for preventing the supply to a load, such as a repeatered cable, of abnormally high amplitude current which would damage the cable or other apparatus in the load circuit.

In a specific embodiment of applicant's invention herein shown and described for the purpose of illustration, a current supply system of the type disclosed in the copending application of G. W. Meszaros, supra, is provided with means for limiting the current supplied to a load, such as a repeatered submarine cable, to a safe maximum amplitude. A choke coil of large inductance is connected in series with the cable conductor over which the direct current is transmitted for increasing the time constant of the circuit and thus reducing the rate of increase of the current when the voltage impressed upon the circuit is suddenly increased. There is provided relay means which responds when the load current has increased to a predetermined amplitude within a range of safe operating amplitudes for connecting a shunt current path across the choke coil and the load in series to thereby reduce the current supplied to the load. The relay means also causes the energization of a motor for controlling the variable transformer to reduce to zero the alternating voltage supplied to the rectifier.

The invention may be better understood by referring to the following description and the accompanying drawing the single figure of which is a schematic view of a current supply apparatus embodying the invention.

There is provided an autotransformer 10 having end terminals 11 and 12 connected to an alternating-current supply source 13 and having a variable tap 14 which is mechanically coupled to the shaft of a two-phase motor 15 so that the variable tap will be driven in one direction or the other along the autotransformer winding as the motor turns to increase or decrease the alternating voltage between the variable tap 14 and terminal 12. The variable tap 14 is connected to one terminal of the primary winding of a transformer 16 and terminal 12 of the autotransformer is connected to the other terminal of the primary winding. The secondary winding of transformer 16 is connected to the input terminals of a varistor bridge rectifier 17, a ripple filter comprising a series inductance element 18 and a shunt condenser 19 being connected to its output terminals. The positive output terminal of rectifier 17 is connected through filter inductance element 18 to the anode of a regulator space current device 20. The cathode of tube 20 is connected through a resistor 21 and through a choke coil 22 of large inductance, say 50 henries, to the center conductor 23 of a cable such as a submarine telephone cable. The cable also comprises an outer conductor 24, a metallic, grounded sheath 25 and spaced repeaters, not shown, embedded in the cable for amplifying telephone signals transmitted over the cable. The grounded sheath 25 serves as a return conductor for the direct current transmitted over the cable, the negative output terminal of rectifier 17 being connected through a resistor 26 to ground. The operating power for repeaters is obptained by connecting the heater filaments of space current amplifying tubes in series between adjacent sections of the center conductor 23 and using the voltage drop across the filaments as the source of space current supply voltage.

The voltage drop across resistor 21 is amplified by a space current amplifier 27 and the output voltage of the amplifier is impressed upon the control grid-cathode circuit of the tube 20 so that, as the current supplied to the cable through resistor 21 increases, for example, the anode-cathode resistance of tube 20 increases and the voltage drop across this anode-cathode path increases to cause the current increase to be minimized. Similarly, when the current supplied to the cable load decreases, the voltage drop across the space current path of tube 20 decreases to tend to maintain the cable current constant.

An effective voltage which varies from time to time is introduced into the cable load circuit due to earth potentials. To maintain the load current substantially constant it is necessary to vary the input voltage impressed upon the cable over a wide range to compensate for the varying voltage which is introduced due to earth potentials. The input voltage changes introduced by the voltage variations across the space current path of tube 20 are not always of sufficient magnitude to compensate for the voltage variations introduced into the load circuit due to the earth potentials. Means are therefore provided, as described below, for controlling the alternating voltage supplied from autotransformer 10 to rectifier 17 in response to voltage changes across the space current path of tube 20.

A circuit may be traced from terminal 11 of autotransformer 10, through inductance element 30 and through a winding 31 of a saturable inductance device to the terminal 12 of the autotransformer. The saturable inductance device also has a saturating winding 32 connected across the space current path of tube 20. As the resistance of the space current path and the voltage across it increase, for example, the current through the saturating winding 32 also increases to cause the inductance of winding 31 to decrease. One winding 33 of motor 15 is connected in series with a condenser 34 across the half portion of autotransformer 10 between the terminal 12 and a fixed tap 35 electrically mid-way between the terminals 11 and 12. The second winding 36 of motor 15 is in a current path connecting mid-tap 35 of the autotransformer and a common terminal of inductance device 30 and winding 31 of the saturable reactor, this path being normally completed through the armature and upper contacts of a relay 37 when released. A filter comprising a condenser 38 and an inductance device 39 is provided across motor winding 36 to suppress third harmonic components of the power line frequency. A shunt resistor 85 is also connected across motor winding 36. A filter comprising condenser 40, inductance element 41 and resistor 42 is provided for suppressing alternating current which may be introduced into the reactor winding 32.

When the voltage drop across the anode-cathode path of tube 20 has a predetermined normal value the inductance of winding 31 will be substantially equal to the inductance of the ballast reactor 30. For this condition the voltage between the fixed tap 35 of autotransformer 10 and the common terminal of reactor 30 and winding 31 will be equal substantially to zero and no current will flow through motor winding 36. When the voltage drop across the anode-cathode path of tube 20 increases or decreases with respect to the predetermined voltage, the winding 36 is energized to cause the motor to drive the brush 14 in a direction to decrease the output voltage of the autotransformer in response to an increase of voltage drop across tube 20 and in a direction to increase the output voltage in response to a decrease of voltage drop across tube 20. However, when the direct current supplied to the load increases to an amplitude above the normal operating range, means are provided for energizing relay 37 to complete a circuit for connecting motor winding 36 across the half portion of autotransformer 10 between terminal 12 and the mid-tap 35. As a result the motor drives the tap 14 to the position for which zero voltage is impressed upon the rectifier 17.

The load current upon reaching a predetermined amplitude above the normal operating range produces a sufficient voltage drop across resistor 26 to cause the operation of a relay 50 to thereby complete an energizing circuit from battery 80 for a relay 51. The operation of relay 51 opens an energizing circuit for a relay 52 to cause the release of its armatures 53 and 54, relay 52 being normally energized by current from a battery 83. The release of armature 53 completes an energizing circuit from battery 81 for a relay 55 to cause its armatures 56 and 57 to be attracted. There is thus completed a shunt circuit from the common terminal of resistor 21 and choke coil 22 through a resistor 58 and armature 56 to ground. Relay 51 is locked up through a circuit comprising armature 57 of relay 55 and a key 59. The release of armature 54 of relay 52 completes an energizing circuit from battery 82 for relay 37.

A potentiometer 60 is provided in a current path connecting the common terminal of resistor 21 and choke coil 22 and the negative output terminal of rectifier 17. There are also provided a space current triode 61 and a rectifier comprising a twin-diode tube 62 to which alternating current from source 13 is supplied through a transformer 63. A ripple filter for the rectifier comprises the series inductive reactor 64 and the shunt condenser 65. The anode of tube 61 is connected through the filter inductance element 64 to the cathode of rectifier tube 62 and the cathode of tube 61 is connected through resistor 66 and the winding of a relay 67 to the negative output terminal of the rectifier which is connected to ground. The variable tap of potentiometer 60 is connected to the control grid electrode of tube 61.

When the voltage across potentiometer 60 rises to a value above the normal operating range, the grid of tube 61 becomes relatively more positive with respect to its cathode to cause the current in the winding of relay 67 to increase sufficiently to operate the relay which thus completes an energizing circuit from battery 84 for a relay 68. Relay 68 in operating locks up through a circuit completed through its armature 69 and a key 70. There is also completed through armature 71 of relay 68 an energizing circuit for relay 37. Apparatus including a recording voltmeter 72 is connected across the potentiometer 60. Therefore when the voltage across the potentiometer 60 rises to a sufficiently high value above the normal operating range, relay 37 is energized to cause the voltage impressed upon the input of rectifier 17 to be reduced to zero, thus interrupting the supply of direct current to the cable. To subsequently release the relay 37 it will be necessary to operate the key 70 to open the holding circuit for relay 68 or the key 59 to open the holding circuit for relay 51, if that relay has operated. The apparatus for reducing or interrupting the supply of current from rectifier 17 in response to a high voltage condition serves to protect apparatus such as the recording voltmeter 72 from excessive voltage. This protective apparatus also serves to protect the cable from excessive cable voltages due to abnormally large opposing ground potentials and also serves to protect the cable in case relay 50, for example fails to function properly or if the circuit including relays 50, 51, 52 and 55 is taken out of service for maintenance purposes.

The cable is protected from excessive current by the protective system which comprises choke coil 22, the shunt current path including resistor 58 and relays 50, 51, 52, 55 and 37. If a short circuit should occur from the anode to cathode of tube 20, for example, relays 50, 51, 52 and 55 would operate to complete the shunt path including resistor 58. The load thus added to the rectifier circuit would increase the voltage drop across the series resistance in the supply circuit including the resistance of the varistors of rectifier 17 and resistors 21 and 26, thus reducing the voltage impressed upon the cable and the cable current. During the time required for operating the relays which complete the shunt path including resistor 58, the cable current is prevented from rising to a sufficient amplitude to cause damage to the cable due to the back electromotive force set up across the large inductance of choke coil 22. While the protective shunt path comprising resistor 58 is being completed, the energizing circuit for relay 37 is also completed to cause a reduction of the alternating current supplied to retifier 17 to effect a further reduction of the direct current supplied to the cable.

What is claimed is:

1. In combination, a rectifier, means for supplying current from an alternating-current source to said rectifier, an inductance device, means for supplying rectified current from said rectifier through said inductance device to a load, and means responsive to an increase of load current to a predetermined amplitude for closing a shunt current path across said load and inductance in series and for reducing the voltage of said alternating-current source, whereby excessive current is prevented from flowing through said load.

2. The combination with means for supplying current from a direct-current supply source to a load circuit including a load, of protective means for limiting to a safe amplitude the current supplied from said source to said load comprising means responsive to an increase of current in said load circuit to a predetermined amplitude for completing a shunt current path across said load circuit, means in said load circuit for transiently maintaining the current in said load circuit below a maximum safe amplitude while said shunt current path is being completed, and means responsive to the increase of current in said load circuit to said predetermined amplitude for decreasing the voltage of said supply source.

3. In combination, means for supplying current from a direct-current source to a load circuit including a load, regulating means in said load circuit responsive to current changes in said load circuit for minimizing said current changes, circuit closing means responsive to a failure of said regulating means for completing a shunt current path across a portion of said load circuit including said load and for reducing the voltage of said supply source, and means in said portion of said load circuit for limiting the current in said portion during a transient period required for operating said circuit closing means.

4. In combination, a rectifier for rectifying current from an alternating-current supply source, a load circuit comprising a load connected to the output of said rectifier, regulating means in said load circuit responsive to current changes therein for minimizing said current changes, circuit closing means responsive to a failure of said regulating means for completing a shunt current path across a portion of said load circuit including said load and for reducing the voltage of said supply source, and means in said portion of said load circuit for reducing the rate of increase of current in said circuit portion during a transient period required for operating said circuit closing means.

5. In combination, a rectifier, means comprising a variable transformer for supplying current from an alternating-current supply source to said rectifier, means comprising a motor for changing the primary to secondary turns ratio of said transformer to vary the input voltage impressed upon said rectifier, a load circuit comprising a load connected to the output of said rectifier, regulating means in said load circuit responsive to current changes therein for minimizing said current changes, said regulating means comprising a space current device having its space current path connected in said load circuit and means for increasing the resistance of said space current path in response to an increase of load current, and vice versa, means responsive to the voltage drop across said space current path for causing said motor to be energized to decrease the input voltage impressed upon said rectifier when the voltage drop across said space current path increases, and vice versa, a first electromagnetic relay means responsive to an abnormally large increase of load current such as would be caused by a short circuiting of said space current path for completing a shunt current path across a portion of said load circuit including said load, a second electromagnetic relay means responsive to the operation of said first electromagnetic relay means for causing the energization of said motor in a direction to decrease the input voltage impressed upon said rectifier, and an inductance device in said portion of said load circuit for reducing the rate of increase of current in said circuit portion during a transient period required for operating said first electromagnetic relay means.

6. A combination in accordance with claim 5 in which are provided a third electromagnetic relay means responsive to a voltage of predetermined magnitude across said portion of said load circuit for operating said second relay means to reduce the input voltage impressed upon said rectifier.

7. In combination, a space current device having a space current path, means for supplying current from a direct-current source through said space current path to a load circuit including a load, means responsive to a decrease of current in said load circuit for decreasing the resistance of said space current path and vice versa, means responsive to a decrease of the voltage drop across said space current path for increasing the voltage of said direct-current source and vice versa, and means responsive to an increase of the current in said load circuit to an abnormally high amplitude due to failure of said space current device, for example, for decreasing the voltage of said direct-current source.

8. A combination in accordance with claim 7 in which means are provided for shunting a portion of the load circuit including the load in response to an increase of the load current to said abnormally high amplitude.

9. A combination in accordance with claim 8 in which there is provided in said portion of the load circuit an inductive reactor for reducing the rate of increase of the current supplied to the load during a transient period.

10. In combination, means for supplying current from a direct-current supply source to a load circuit including a load, regulating means connected in series with said supply source and said load circuit for introducing a voltage drop which increases in response to an increase of current supplied to said load circuit and vice versa, during normal operation, means responsive to an increase of voltage drop across said regulating means for reducing the voltage of said supply source and vice versa, during normal operation, and means responsive to an abnormally high current supplied from said supply source to said load circuit for causing the completion of a shunt current path for diverting current from said load and for reducing the voltage of said supply source irrespective of the voltage drop or any change of voltage drop across said regulating means.

HARRY H. SPENCER.

REFERENCES CITED

The following references are of record in the file of this patent:

UNITED STATES PATENTS

| Number | Name | Date |
|---|---|---|
| 1,690,271 | Clement | Nov. 6, 1928 |
| 1,796,497 | Weaver | Mar. 17, 1931 |
| 1,849,518 | Gay | Mar. 15, 1932 |
| 2,299,942 | Trevor | Oct. 27, 1942 |
| 2,431,994 | Dibrell et al. | Dec. 2, 1947 |
| 2,453,263 | Potter | Nov. 9, 1948 |
| 2,556,129 | Wellons | June 5, 1951 |
| 2,573,744 | Trueksess | Nov. 6, 1951 |
| 2,577,151 | Potter | Dec. 4, 1951 |